United States Patent
Withopf et al.

(10) Patent No.: US 9,063,834 B2
(45) Date of Patent: Jun. 23, 2015

(54) FILTERING METHOD AND FILTER DEVICE FOR SENSOR DATA

(71) Applicants: Daniel Withopf, Stuttgart (DE); Susanne Stierlin, Leonberg (DE)

(72) Inventors: Daniel Withopf, Stuttgart (DE); Susanne Stierlin, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/800,923

(22) Filed: Mar. 13, 2013

(65) Prior Publication Data
US 2013/0245929 A1    Sep. 19, 2013

(30) Foreign Application Priority Data

Mar. 13, 2012 (DE) .................. 10 2012 203 909

(51) Int. Cl.

| | |
|---|---|
| G06F 17/00 | (2006.01) |
| G01S 7/40 | (2006.01) |
| G01S 13/58 | (2006.01) |
| G01S 13/93 | (2006.01) |
| G01S 17/93 | (2006.01) |
| G01S 7/497 | (2006.01) |
| B60W 30/08 | (2012.01) |
| B60W 50/00 | (2006.01) |

(52) U.S. Cl.
CPC .............. *G06F 17/00* (2013.01); *G01S 17/936* (2013.01); *G01S 7/4021* (2013.01); *G01S 7/497* (2013.01); *G01S 13/588* (2013.01); *G01S 13/931* (2013.01); *G01S 2013/9342* (2013.01); *G01S 2013/9346* (2013.01); *G01S 2013/9321* (2013.01); *B60W 30/08* (2013.01); *B60W 2050/0052* (2013.01)

(58) Field of Classification Search
USPC ........................................... 701/301; 382/103
See application file for complete search history.

(56) References Cited

U.S. PATENT DOCUMENTS

| 5,960,097 | A * | 9/1999 | Pfeiffer et al. | ............... 382/103 |
|---|---|---|---|---|
| 6,535,114 | B1 * | 3/2003 | Suzuki et al. | ............... 340/435 |
| 2004/0151344 | A1 * | 8/2004 | Farmer et al. | ............... 382/103 |
| 2008/0180528 | A1 * | 7/2008 | Saito | ............. 348/148 |
| 2010/0208063 | A1 * | 8/2010 | Lee et al. | ............. 348/143 |

\* cited by examiner

*Primary Examiner* — John R Olszewski
*Assistant Examiner* — Jason Roberson
(74) *Attorney, Agent, or Firm* — Kenyon & Kenyon LLP

(57) ABSTRACT

A filtering method for sensor data formed by a sensor system for acquiring objects, including: measurement of a scaling value from the sensor data, the scaling value corresponding to a change in size of an object from the sensor data over a time interval, determination of a measurement error parameter of the scaling value, and execution of a Kalman filtering based immediately on the measured scaling value, the time interval, and the measurement error parameter, in order to estimate at least one normalized motion parameter of the object relative to the sensor system. A related filter device, a driver assistance system, and a computer program are also described.

6 Claims, 3 Drawing Sheets

FILTERING METHOD AND FILTER DEVICE FOR SENSOR DATA

RELATED APPLICATION INFORMATION

The present application claims priority to and the benefit of German patent application no. 10 2012 203 909.0, which was filed in Germany on Mar. 13, 2012, the disclosure of which is incorporated herein by reference.

FIELD OF THE INVENTION

The present invention relates to a filtering method and a filter device for sensor data. The present invention further relates to a driver assistance system for a vehicle, as well as a computer program.

BACKGROUND INFORMATION

Adaptive cruise control systems and collision warning systems are known as driver assistance systems for vehicles. Generally, such systems include a radar sensor that is capable of measuring a distance from the vehicle driving in front of the home vehicle. Alternatively, these functions can also be realized on the basis of image data of a video sensor. Based on the measured sensor data, the system then regulates a corresponding distance, or provides a warning of an imminent collision.

As a rule, here it is necessary that the sensor data be prepared for further processing in order for example to make it possible to make reliable predictions concerning a collision time.

SUMMARY OF THE INVENTION

An object of the exemplary embodiments and/or exemplary methods of the present invention can therefore be regarded as providing an improved filtering method for sensor data that enables an efficient and reliable calculation of a collision time.

Another object of the exemplary embodiments and/or exemplary methods of the present invention can also be seen as providing a corresponding filter device for sensor data.

Another object of the exemplary embodiments and/or exemplary methods of the present invention can also be seen as indicating a corresponding driver assistance system for a vehicle.

In addition, an object of the exemplary embodiments and/or exemplary methods of the present invention can be regarded as providing a corresponding computer program.

These objects are achieved by the respective subject matter of the described embodiments. Advantageous embodiments are the subject matter of the further descriptions herein.

According to an aspect of the exemplary embodiments and/or exemplary methods of the present invention, a filtering method for sensor data is provided. Here, the sensor data are formed by a sensor system for acquiring objects. The filtering method further includes a measurement of a scaling value, in particular a plurality of scaling values, from the sensor data, the scaling value corresponding to a change in size of an object from the sensor data over a time interval. In addition, a measurement error parameter of the scaling value is determined. A Kalman filtering is then carried out immediately based on the measured scaling value, which may be based on the measured scaling values, the time interval, and the measurement error parameter, in order to measure at least one normalized motion parameter, which may be a normalized relative velocity, of the object relative to the sensor system.

According to a further aspect of the exemplary embodiments and/or exemplary methods of the present invention, a filter device is provided for sensor data formed by a sensor system for acquiring objects. The filter device includes a measurement device for measuring a scaling value from the sensor data, the scaling value corresponding to a change in size of an object from the sensor data over a time interval. In addition, a determining device is provided for determining a measurement error parameter of the scaling value. The filter device further includes a Kalman filter, in particular a plurality of Kalman filters, for carrying out a Kalman filtering immediately based on the measured scaling value, the time interval, and the measurement error parameter, in order to estimate at least one normalized motion parameter of the object relative to the sensor system.

According to a further aspect of the exemplary embodiments and/or exemplary methods of the present invention, a driver assistance system for a vehicle is provided. The driver assistance system includes the filter device and a sensor system for acquiring objects.

According to another aspect of the exemplary embodiments and/or exemplary methods of the present invention, a computer program is provided that includes program code for carrying out the filtering method for sensor data when the computer program is executed on a computer.

Thus, the exemplary embodiments and/or exemplary methods of the present invention include in particular the idea of carrying out a Kalman filtering, this Kalman filtering being based immediately on the measured scaling value, the time interval, and the measurement error parameter. In the sense of the exemplary embodiments and/or exemplary methods of the present invention, "immediately" means in particular that the measured scaling value, the time interval, and the measurement error parameter are used directly for the Kalman filtering, or are provided or given directly to the Kalman filter. In particular, possible intermediate steps are not provided here. This means in particular that the above-named values are not first of all further processed to form a corresponding intermediate value that is then provided to the Kalman filter in order to carry out a Kalman filtering based on this intermediate value. Thus, this means in particular that, advantageously, only one scaling value need be measured per time interval in order to estimate the normalized motion parameter using the Kalman filtering. Up to now, in known methods it was necessary to measure a large number of scaling values, these scaling values then being further processed using for example a maximum likelihood estimator; only then were these further-processed values or data provided to a Kalman filter. Because in this preprocessing step the maximum likelihood estimator depends on a large number of scaling values—as a rule more than 10 and in particular more than 20—the corresponding computing steps are time-intensive and very computing-intensive. Such corresponding known methods are in particular not suitable for use in real time.

These disadvantages are overcome by the exemplary embodiments and/or exemplary methods of the present invention in an advantageous manner in that a use in real time is advantageously enabled due to the significantly lower computing outlay. The storage requirement and required initialization time are advantageously also less compared to the existing art, because in particular it is not necessary to determine and store a long history of data and intermediate results.

Based on the at least one normalized motion parameter, it is then advantageously possible to calculate a time of collision between the sensor system and the object. This means in particular that a driver assistance system according to the present invention can provide a reliable warning of a possible collision and/or can autonomously intervene in the operation of a vehicle in order to prevent the collision or reduce its severity.

In the context of the exemplary embodiments and/or exemplary methods of the present invention, a Kalman filter, in particular a Kalman subfilter, is to be understood as a filter that is capable of carrying out an expanded Kalman filtering. Thus, in the context of the exemplary embodiments and/or exemplary methods of the present invention the term "Kalman filtering" refers to an expanded Kalman filtering with a nonlinear system model.

If a plurality of Kalman filters are combined, the individual filters used are referred to as "subfilters," also "Kalman subfilters."

According to a specific embodiment, using the Kalman filtering a plurality of normalized motion parameters can be estimated. Two normalized motion parameters may be estimated. Through the estimation of a plurality of normalized motion parameters, advantageously an increased precision is achieved of values that are derived from the normalized motion parameters, i.e. calculated based thereon.

In a specific embodiment, it can be provided that the normalized motion parameter is a normalized velocity of the object relative to the sensor system. Such a normalized relative velocity can be designated in the following as $v_{norm}$. Here it can be provided that $$v_{norm} = \frac{v_{rel}}{d}$$

Here d designates a distance between the sensor system and the object. $v_{rel}$ is a relative velocity between the sensor system and the object.

In another specific embodiment, it can be provided that in addition a further normalized motion parameter, for example the normalized relative acceleration, is used. Such a normalized relative acceleration can be designated below as $a_{norm}$. Here it can be provided that $$a_{norm} = \frac{a_{rel}}{d}$$

Here d is the distance between the sensor system and the object. $a_{rel}$ designates an acceleration of the sensor system relative to the object.

In the following, it can be provided that the time interval is designated $\Delta t$. The scaling value between the two time points t, t' with temporal distance $\Delta t$ can then be defined in particular as follows:

$$s(\Delta t) = \frac{w(t)}{w(t - \Delta t)} = \frac{d(t - \Delta t)}{d(t)}$$

Here s is the scaling value. w is a two-dimensional width of the object in the image, i.e. in the corresponding sensor data, and d designates a three-dimensional distance between the sensor system and the object.

In a further specific embodiment, it can be provided that the measurement error parameter corresponds to a standard deviation $\sigma$ of a normally distributed measurement noise of the scaling value. This means in particular that the measurement error parameter corresponds to a standard deviation of the expected measurement error of the scaling value.

In a further specific embodiment, it can be provided that the sensor system can include one or more sensors for the sensor-based acquisition of objects. The scaling values may then be calculated based on the corresponding sensor data of the sensors. The sensors can have the same design or different designs. In particular, a video sensor can be provided as a sensor. A corresponding sensor system then advantageously forms, in particular, video image data. The sensor system can include a mono camera and/or stereo camera having corresponding video sensors. The sensor can be a radar sensor. In particular, a sensor can be a lidar sensor. For example, the sensor can be an infrared sensor.

In a further specific embodiment, it can be provided that the execution of the Kalman filtering includes an execution of a plurality of different Kalman filters each immediately based on the measured scaling value, the time interval, and the measurement error parameter, in order in each case to estimate at least one normalized motion subparameter of the object relative to the sensor system, each of the various Kalman filterings being based on a different motion model. The statements made in connection with the motion parameter are analogously valid for the normalized motion subparameter. This means in particular that the Kalman filter includes a plurality of Kalman subfilters, also simply called subfilters, that interact with one another or are combined with one another, the Kalman subfilters being correspondingly fashioned for the execution of the above-named steps.

Advantageously, it can be provided that the plurality of Kalman filters are combined with one another. For this purpose, which may be the IMM method, known to those skilled in the art, can be used. Here, "IMM" stands for the English term "Interacting Multiple Model." The IMM method defines an interaction of a plurality of Kalman filters that process the same measurement data in parallel.

Through the provision of such a plurality of Kalman subfilters, or the carrying out of a plurality of different Kalman filterings each based on a different motion model, it is advantageously possible to address different possible situations so that a flexible adaptation to a concrete situation can advantageously be brought about.

According to a further specific embodiment, it can be provided that a collision time is calculated based on the normalized motion parameters.

The collision time is the remaining time until the expected collision. The calculated collision time is subsequently advantageously available for reaching a decision as to whether for example a warning is to be outputted to the driver, and/or whether the driver assistance system will intervene autonomously in the operation of the vehicle.

According to a further specific embodiment, it can be provided that for each Kalman filter used, i.e. in particular for each of the subfilters, a probability value is calculated relating to an agreement between the corresponding motion model and the measured sensor data, the normalized motion subparameters of the Kalman filtering having the largest probability value forming a combined state vector. This means in particular that a probability calculating device is provided that is fashioned so as to carry out the so-called steps.

Due to the fact that in this way the most probable Kalman subfilter determines the normalized motion parameters, in particular it can advantageously be ensured that for corresponding further steps or interventions in vehicle operation, these decisions are based on those parameters that best model reality. In this way, a particularly reliable calculation of a collision time is enabled.

According to a specific embodiment, it can be provided that the motion model is based on the assumption that the object is moving with a constant velocity relative to the sensor system. Such a motion model can be abbreviated or designated "ConstV" in the following.

In a further specific embodiment, it can be provided that the motion model is based on the assumption that the object moves with a constant acceleration relative to the sensor system. Such a motion model can be abbreviated or designated "ConstA" in the following.

In addition, a motion model can be used that is based on the assumption of a constant distance between the object and the sensor system. Such a motion model can be abbreviated for example "ConstD."

If "ConstV" is used, the assumption is made that $a_{rel} = a_{norm} = 0$.

According to another specific embodiment, it can be provided that, based on the at least one normalized motion parameter, a filtered scaling value is calculated. Such a filtered scaling value advantageously has a better signal-to-noise ratio compared to the directly measured raw data regarding the scaling value. In a further specific embodiment, it can be provided that a normalized relative velocity and a normalized relative acceleration are estimated as normalized motion parameters, the filtered scaling value being calculated based on the following mathematical formula:

$$s_{Filter} = 1 - v_{norm} * \Delta t + \frac{1}{2} * a_{norm} * \Delta t^2$$

Here, $s_{Filter}$ designates the filtered scaling value.

In the following, a collision time can be abbreviated in particular as "TTC," or "Time To Collision." It can be provided that the TTC is calculated based on the normalized motion parameter or parameters, which is/are estimated in particular using the filter device.

In the following, the exemplary embodiments and/or exemplary methods of the present invention are explained in more detail on the basis of exemplary embodiments with reference to Figures.

DETAILED DESCRIPTION

Figure 1:
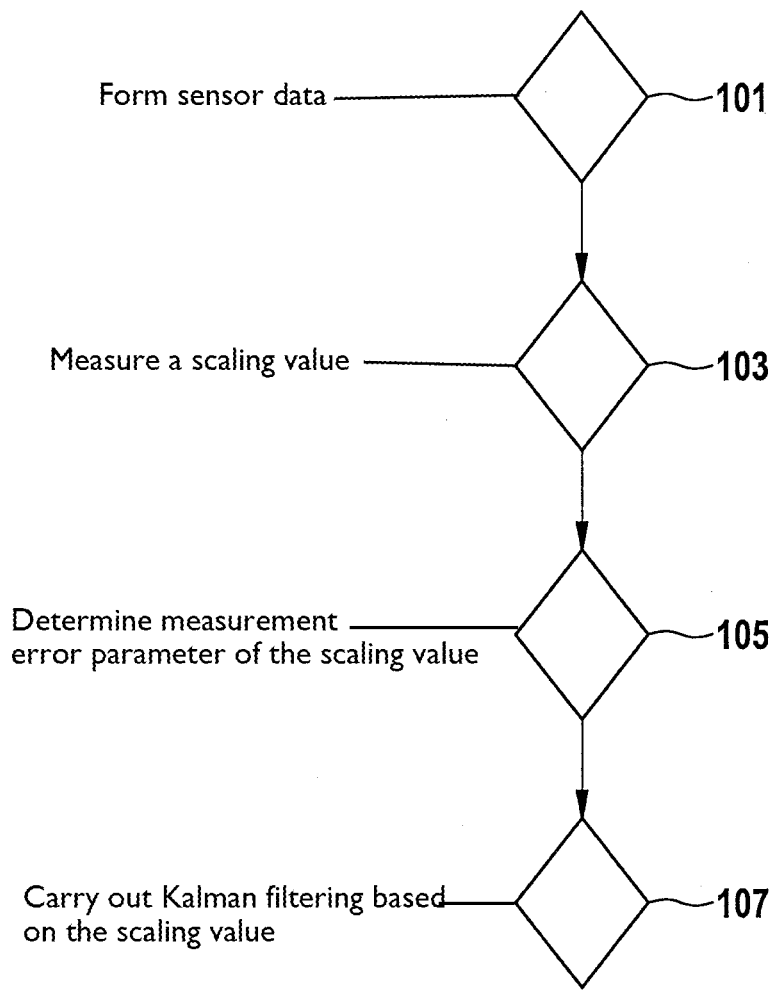
FIG. 1 shows a flow diagram of a filtering method.

In the following, identical reference characters may be used for identical features.

FIG. 1 shows a flow diagram of a filtering method for sensor data formed by a sensor system for acquiring objects in a step 101. In a step 103, a scaling value is measured from the sensor data, the scaling value corresponding to a change in size of an object from the sensor data over a time interval. In a step 105, a measurement error parameter of the scaling value is determined. According to a step 107, a Kalman filtering is carried out immediately based on the measured scaling value, the time interval, and the measurement error parameter, in order to estimate at least one normalized motion parameter of the object relative to the sensor system. In a specific embodiment that is not depicted, it may be provided that steps 103 and 105 are carried out in parallel.

It can be provided according to step 107 that a TTC and/or a filtered scaling value are calculated based on the normalized motion parameter.

Figure 2:
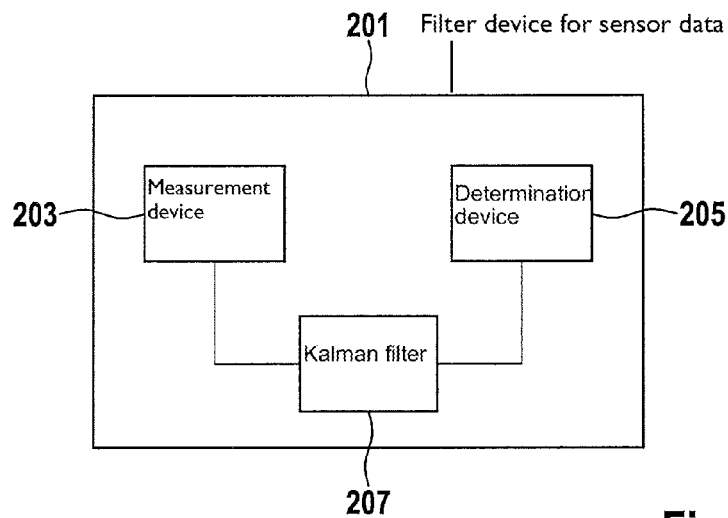
FIG. 2 shows a filter device.

FIG. 2 shows a filter device 201 for sensor data formed by a sensor system for acquiring objects.

Filter device 201 includes a measurement device 203 for measuring a scaling value from the sensor data, the scaling value corresponding to a change in size of an object from the sensor data over a time interval. In addition, a determination device 205 is provided for determining a measurement error parameter of the scaling value. Filter device 201 further includes a Kalman filter 207 for carrying out a Kalman filtering based immediately on the measured scaling value, the time interval, and the measurement error parameter, in order to estimate at least one normalized motion parameter of the object relative to the sensor system.

In a specific embodiment that is not depicted, filter device 201 can include a plurality of Kalman filters 207 that interact with one another by the IMM method.

Figure 3:
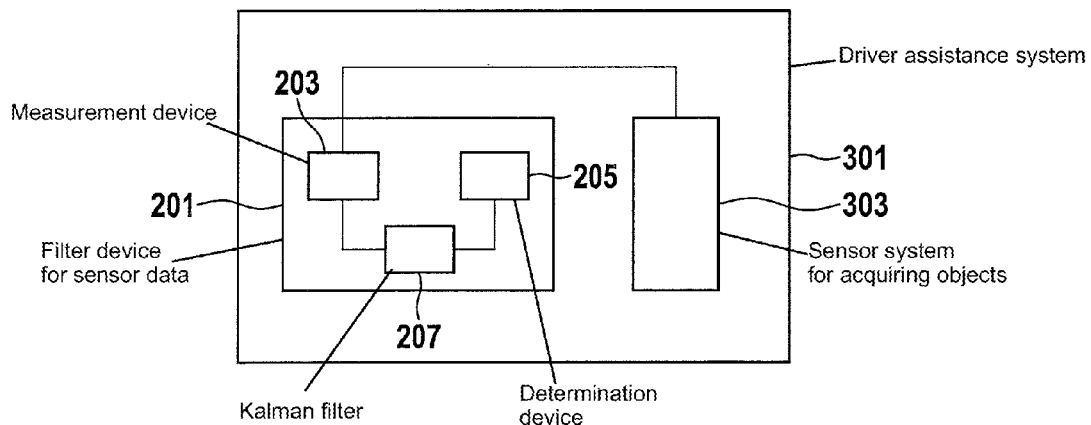
FIG. 3 shows a driver assistance system.

FIG. 3 shows a driver assistance system 301 for a vehicle. Driver assistance system 301 includes filtering device 201 according FIG. 2 as well as a sensor system 303 for acquiring objects. In particular, driver assistance system 301 is fashioned in order to actuate, based on the results that can be derived from the normalized motion parameters, a vehicle actuator system for autonomous intervention in a vehicle system such as brakes, drivetrain, steering, and/or a warning device, in order to warn the driver.

Figure 4:
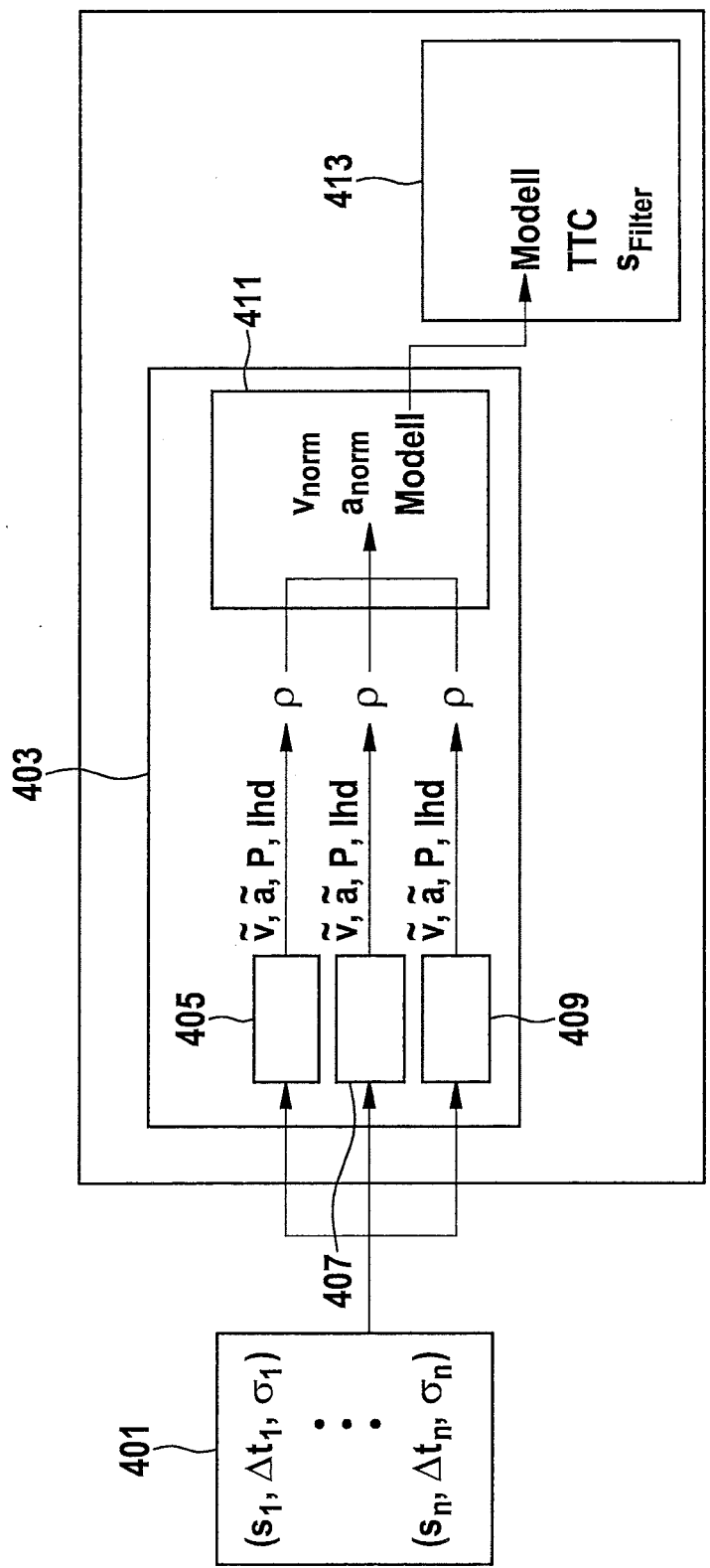
FIG. 4 shows a block diagram of a filtering method.

FIG. 4 shows a block diagram of a further filtering method. In a step 401, a plurality of tuples having the form $$\theta_i(s_i | \Delta t_i | \sigma_i)$$

are inputted into a Kalman filter 403. Here, $s_i$ is a scaling value having an associated time step or time interval $\Delta t_i$, whose measurement noise is normally distributed with standard deviation $\sigma_i$. Here $i = 1, 2, \ldots, n$, where $n \geq 1$.

Kalman filter 403 includes three Kalman subfilters 405, 407, 409. The three subfilters 405, 407, 409 are each fashioned as an automatically operating expanded Kalman filter, and the three Kalman subfilters 405, 407, 409 can interact with one another or be combined by the IMM method.

In a specific embodiment that is not depicted, it can be provided that only two subfilters or more than three subfilters are used. For example, two subfilters can be used, based on ConstV and ConstA respectively. In particular, three subfilters can be used, based respectively on ConstA, ConstV, and ConstA.

Each tuple is supplied to all three Kalman subfilters 405, 407, 409, so that Kalman subfilters 405, 407, 409 each carry out a separate Kalman filtering based on the corresponding tuple. This means in particular that each of Kalman subfilters 405, 407, 409 carries out a Kalman filtering immediately based on the scaling value, the time step, and the standard deviation. Here each of the three Kalman subfilters 405, 407, and 409 are based on a different motion model. The three Kalman subfilters 405, 407, 409 can also differ in particular in the parametrization of the system noise, which models the tolerated deviance from the assumed motion model. Thus, for example Kalman subfilter 405 can be based on motion model "ConstA." Kalman subfilter 407 can be based for example on motion model "ConstV." Kalman subfilter 409 can for example be based on motion model "ConstA" and can differ from filter 405 on the basis of the parametrization of the system noise.

In a specific embodiment that is not depicted, it can be provided that only two Kalman subfilters are used. In this case, subfilter 409 is omitted.

Based on the corresponding Kalman filtering, Kalman subfilters 405, 407, and 409 yield the following results: $\tilde{v}$, $\tilde{a}$, P, lhd. Here $\tilde{v}$ stands for the normalized relative velocity of the corresponding Kalman subfilter 405, 407, and 409. ã designates the normalized relative acceleration of the corresponding Kalman subfilter 405, 407, and 409. P designates a corresponding covariance, i.e. in particular an uncertainty of the corresponding values. lhd is a likelihood parameter that provides a measure of how well the measured sensor data fit ṽ and ã. This means in particular that the likelihood parameter lhd describes a degree of agreement between processed measurement values and estimated internal states, i.e. the normalized motion parameters.

Based on these values, which may be a probability value "ρ" can be calculated that provides a statement of how well the motion model on which the respective Kalman subfilters 405, 407, 409 are based corresponds to reality. The Kalman subfilter having the largest probability value is then the one whose values ṽ and ã are assumed as normalized motion parameters, i.e. as a normalized relative acceleration $a_{norm}$ and a normalized relative velocity $v_{norm}$. This means in particular that according to step 411 Kalman filter 403 carries out an estimation of $v_{norm}$ and $a_{norm}$.

In a step 413, it may then be provided to calculate the TTC and the filtered scaling value $s_{Filter}$; this calculation can be made on the basis of $v_{norm}$ and $a_{norm}$. In particular, the motion model "Model" on which this calculation is based is outputted. This means in particular that the motion model is outputted of that Kalman subfilter that had the largest probability value "ρ."

It can be provided that the filtered scaling value $s_{Filter}$ and the TTC are additionally calculated for each of Kalman subfilters 405, 407, and 409.

It can be provided that according to step 413 the TTC and the filtered scaling value $s_{Filter}$ are formed based on the most probable normalized motion parameters of the Kalman subfilters.

Based on the second-order equation of motion, the following holds in corresponding approximation for Δt:

$$d(t-\Delta t) = d(t) + v_{rel}(t)*(-\Delta t) + \frac{1}{2}*a_{rel}(t)*(-\Delta t)^2$$

$$\frac{d(t-\Delta t)}{d(t)} = 1 + \frac{v_{rel}(t)}{d(t)}*(-\Delta t) + \frac{1}{2}*\frac{a_{rel}(t)}{d(t)}*(-\Delta t)^2$$

Because no collision has yet taken place, d(t)>0, so that division is permissible.

With $$s(\Delta t) = \frac{w(t)}{w(t-\Delta t)} = \frac{d(t-\Delta t)}{d(t)}$$

and $$a_{norm} = \frac{a_{rel}}{d}$$

and $$v_{norm} = \frac{v_{rel}}{d}$$

there results the following relation important for the direct processing of the scaling data, and that can be used as measurement model for the Kalman filter:

$$s(\Delta t) = 1 - v_{norm}*\Delta t + \frac{1}{2}*a_{norm}*\Delta t^2$$

Using the above equation for s(Δt), $s_{Filter}$ can advantageously be calculated based on the filtered final results, i.e. in particular on the normalized motion parameters of subfilters 405, 407, 409, using the following equation:

$$s_{Filter}(\Delta t) = 1 - v_{norm}*\Delta t + \frac{1}{2}*a_{norm}*\Delta t^2$$

The TTC, i.e. the collision time, based on motion model ConstV, which may result as follows:

$$TTC_{constV} = -\frac{1}{v_{norm}}$$

The TTC based on motion model ConstA results in particular as follows:

$$TTC_{constA} = \frac{-v_{norm} \pm \sqrt{v_{norm}^2 - 2*a_{norm}}}{a_{norm}}$$

The exemplary embodiments and/or exemplary methods of the present invention therefore in particular provide that for each time step a quantity of n≥1 tuples of the form $$\theta_i(s_i|\Delta t_i|\sigma_i)$$

can be processed.

In comparison with known methods, a strength of the method according to the present invention is that scaling values or scaling data having different characteristics can be processed in common.

Thus, for example scaling values can be processed for different time steps $\Delta t_i$.

In addition, data of different sensors, for example from a mono or stereo camera, can also be processed.

In addition, in particular different calculating methods can be provided for extracting or measuring the scaling value from the sensor data. For example, the scaling value can be calculated using a method based on the optical flux between two video images. In addition, which may be alternatively or in addition the measured object width and/or the measured object height can be used to determine the scaling value. In addition, it can in particular be provided that the scaling value, i.e. the scaling, is derived from the position of lights on the object. This has in particular the advantage that such a method is suitable even under conditions of darkness or poor lighting conditions.

In addition, it can be provided that, as a function of an available computing time, a differing quality is provided in the calculation of the scaling value. For this purpose, in particular a resolution of a video image that is used, and/or a number of integrations of an optimization method, can be varied. A size of a viewed image region can also be changed, for example by placing a box around the entire object, for example the vehicle, or only in the area of the license plate.

As a function of a quality of the calculating method used and of the set parameters, which may be the standard deviation of the expected error $\sigma_i$ is set. This advantageously determines an influence of the respective input value on the filtering end result. The number of input values can advantageously vary over time. If no measurement is present for a time step, the results for this time can advantageously merely be predicted by the Kalman filter.

The processing of the tuples $\theta_i$ by the Kalman filter or by the Kalman subfilters can supply the following results:

One result is in particular a decision as to which model (ConstV or ConstA) best describes the current driving situation. From this it can follow in particular that the model ConstA is selected only if the observed acceleration is significantly different from 0. This can advantageously be used to influence a warning strategy of an anticollision driver assistance system.

In addition, as a further result a filtered state vector is obtained that may combine the results of the individual filters, i.e. the Kalman subfilters. The entries of this vector may be the normalized motion parameters of $v_{norm}$ and $a_{norm}$, which can subsequently be used for further calculations.

The current TTC then results as follows, depending on which model of motion is used:

$$TTC_{constV} = -\frac{1}{v_{norm}}$$

$$TTC_{constA} = \frac{-v_{norm} \pm \sqrt{v_{norm}^2 - 2*a_{norm}}}{a_{norm}}$$

If the motion model ConstA was selected, this value advantageously takes into account, in addition to the relative velocity, the relative acceleration between the vehicles.

In addition, the calculation of a filtered scaling value $S_{Filter}$ is advantageously enabled. This is advantageously extremely useful for video-based adaptive cruise control systems, because such a filtered scaling value has a significantly better signal-to-noise ratio than the measured raw data, which advantageously enables for example a harmonic regulation of a longitudinal acceleration of the vehicle.

In addition, the exemplary embodiments and/or exemplary methods of the present invention have in particular the following advantages in comparison with known systems:

Processing of scaling data that can reliably be extracted from the video image data. Distance measurement values are not required.

Only one scaling value is required per time step. This means a significantly lower computing expense in comparison with systems that require two or more scaling values. The memory requirement and required initialization time are thus less, because it is not necessary to determine and store a long history of data and intermediate results.

If a plurality of scaling values are present, these can be processed taking into account their respective measurement noise. The strength of the method is that it is possible to flexibly combine different types of scaling information. These can for example originate from different sensors and can be calculated for differently sized time steps or by different algorithms. A necessary condition for corresponding calculations can for example be that for each value the associated standard deviation of the measurement error is also supplied, and the measurement error can be assumed to have a normal distribution around zero.

The scaling data are processed directly with the aid of the Kalman filter without requiring upstream estimators. An extra preprocessing step, as in the existing art, is omitted.

The TTC can be correctly calculated, taking into account, in addition to the relative velocity, a possible relative acceleration between the objects, in particular vehicles. The method according to the present invention thus goes beyond many other methods known from the literature that use significantly simpler assumptions.

A filtered scaling value can be calculated having a significantly better signal-to-noise ratio compared to the raw data. Such a filtered scaling value has up to now not been mentioned in any publication in connection with the TTC.

In addition, the model decision advantageously provides information as to whether or not a significant relative acceleration is observed for the current driving situation. This information is not available for methods that operate without IMM, i.e. without an Interacting Multiple Model. This means in particular that this information is not available for methods that do not use a plurality of subfilters that support different motion models.

What is claimed is:

1. A filtering method for filtering sensor data formed by a sensor system of a vehicle for detecting objects, the method comprising:
    measuring a scaling value from the sensor data, the scaling value corresponding to a change in size of an object external to the vehicle from the sensor data over a time interval;
    determining a measurement error parameter of the scaling value;
    executing a Kalman filtering immediately based on the measured scaling value, the time interval, and the measurement error parameter, to estimate at least one normalized motion parameter of the object relative to the sensor system,
    wherein the execution of the Kalman filtering includes an execution of a plurality of different Kalman filterings, wherein each of the Kalman filterings is (i) based on a different motion model, (ii) immediately based on the measured scaling value, the time interval, and the measurement error parameter, and (iii) executed to estimate at least one normalized motion subparameter of the object relative to the sensor system,
    wherein for each of the executed Kalman filterings, a probability value, representing a comparison of the corresponding motion model to measured sensor data, is calculated;
    selecting the normalized motion subparameter of a selected one of the Kalman filterings which has the greatest probability value as the normalized motion parameter;
    calculating, based on the selected normalized motion parameter, a time to collision to the object external to the vehicle; and
    regulating, based on the calculated time to collision, a driver assistance system of the vehicle.

2. The filtering method of claim 1, wherein a filtered scaling value is calculated based on the at least one normalized motion parameter.

3. The filtering method of claim 2, estimating a normalized relative velocity and a normalized relative acceleration as normalized motion parameters, and determining the filtered scaling value based on the following mathematical formula:

$$s_{Filter}(\Delta t) = 1 - v_{norm}*\Delta t + \tfrac{1}{2}*a_{norm}*\Delta t^2.$$

4. A filter device for filtering sensor data formed by a sensor system of a vehicle for detecting objects, comprising:
    a measurement device to measure a scaling value from the sensor data, the scaling value corresponding to a change in size of an object external to the vehicle from the sensor data over a time interval;
    a determining device to determine a measurement error parameter of the scaling value;
    a Kalman filter to execute a Kalman filtering immediately based on the measured scaling value, the time interval, and the measurement error parameter, to estimate at least one normalized motion parameter of the object relative to the sensor system, wherein the Kalman filter includes a plurality of Kalman subfilters, wherein the Kalman filtering of each Kalman subfilter is based on a different motion model, wherein each of the Kalman subfilters executes a Kalman filtering immediately based on the measured scaling value, the time interval, and the measurement error parameter, and wherein each of the Kalman subfilters is executed to estimate at least one normalized motion subparameter of the object relative to the sensor system;

a probability calculating device to calculate, for each Kalman filtering of the plurality of Kalman filterings, a probability value representing a comparison of the corresponding motion model to measured sensor data;

a selecting device to select the normalized motion subparameter of a selected one of the Kalman filterings which has the greatest probability value as the normalized motion parameter;

a calculating device to calculate, based on the selected normalized motion parameter, a time to collision to the object external to the vehicle; and a regulating device to regulate, based on the calculated time to collision, a driver assistance system of the vehicle.

5. A driver assistance system for a vehicle, comprising:
a sensor system for detecting objects; and
a filter device for filtering sensor data formed by the sensor system for acquiring objects, including:
  a measurement device to measure a scaling value from the sensor data, the scaling value corresponding to a change in size of an object external to the vehicle from the sensor data over a time interval;
  a determining device to determine a measurement error parameter of the scaling value;
  a Kalman filter to execute a Kalman filtering immediately based on the measured scaling value, the time interval, and the measurement error parameter, to estimate at least one normalized motion parameter of the object relative to the sensor system,
  wherein the Kalman filter includes a plurality of Kalman subfilters, wherein the Kalman filtering of each Kalman subfilter is based on a different motion model, wherein each of the Kalman subfilters executes a Kalman filtering immediately based on the measured scaling value, the time interval, and the measurement error parameter, and wherein each of the Kalman subfilters is executed to estimate at least one normalized motion subparameter of the object relative to the sensor system;
  a probability calculating device to calculate, for each Kalman filtering of the plurality of Kalman filterings, a probability value representing a comparison of the corresponding motion model to measured sensor data;
  a selecting device to select the normalized motion subparameter of a selected one of the Kalman filterings which has the greatest probability value as the normalized motion parameter;
  a calculating device to calculate, based on the selected normalized motion parameter, a time to collision to the object external to the vehicle; and
  a regulating device to regulate, based on the calculated time to collision, the driver assistance system of the vehicle.

6. A non-transitory computer readable medium having a computer program having program codes which, when executed by a processor, performs a method for filtering sensor data formed by a sensor system of a vehicle for detecting objects, the method comprising:
  measuring a scaling value from the sensor data, the scaling value corresponding to a change in size of an object external to the vehicle from the sensor data over a time interval;
  determining a measurement error parameter of the scaling value; and
  executing a Kalman filtering immediately based on the measured scaling value, the time interval, and the measurement error parameter, to estimate at least one normalized motion parameter of the object relative to the sensor system,
  wherein the execution of the Kalman filtering includes an execution of a plurality of different Kalman filterings, wherein each of the Kalman filterings is (i) based on a different motion model, (ii) immediately based on the measured scaling value, the time interval, and the measurement error parameter, and (iii) executed to estimate at least one normalized motion subparameter of the object relative to the sensor system,
  wherein for each of the executed Kalman filterings, a probability value, representing a comparison of the corresponding motion model to measured sensor data, is calculated;
  selecting the normalized motion subparameter of a selected one of the Kalman filterings which has the greatest probability value as the normalized motion parameter;
  calculating, based on the selected normalized motion parameter, a time to collision to the object external to the vehicle; and
  regulating, based on the calculated time to collision, a driver assistance system of the vehicle.

* * * * *